United States Patent
Lagerberg

(10) Patent No.: US 6,447,218 B1
(45) Date of Patent: Sep. 10, 2002

(54) CUTTING INSERT WITH COOLING CHANNEL

(75) Inventor: Stig Lagerberg, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/601,357

(22) PCT Filed: Jan. 27, 1999

(86) PCT No.: PCT/SE99/00117

§ 371 (c)(1),
(2), (4) Date: Sep. 8, 2000

(87) PCT Pub. No.: WO99/39853

PCT Pub. Date: Aug. 12, 1999

(30) Foreign Application Priority Data

Feb. 3, 1998 (SE) ................................. 9800304

(51) Int. Cl.⁷ ............................................... B23B 27/22
(52) U.S. Cl. ......................... 407/114; 407/115; 407/116
(58) Field of Search ................. 407/116, 114, 407/115, 11, 117

(56) References Cited

U.S. PATENT DOCUMENTS

| | | | | |
|---|---|---|---|---|
| 3,791,001 A | * | 2/1974 | Bennett | 407/113 |
| 4,479,744 A | * | 10/1984 | Stricker | 407/114 |
| 5,148,728 A | | 9/1992 | Mazurkiewicz | |
| 5,221,164 A | | 6/1993 | Allaire | |
| 5,628,590 A | | 5/1997 | Beeghly et al. | |
| 5,688,081 A | * | 11/1997 | Pava | 407/115 |
| 5,901,623 A | * | 5/1999 | Hong | 82/50 |
| 6,065,554 A | * | 5/2000 | Taylor et al. | 175/430 |
| 6,312,324 B1 | * | 11/2001 | Mitsui et al. | 451/540 |

FOREIGN PATENT DOCUMENTS

| | | |
|---|---|---|
| DE | 37 40 814 | 6/1989 |
| SU | 1 611 583 | 12/1990 |
| WO | WO92/11108 | 7/1992 |

* cited by examiner

Primary Examiner—Henry Tsai
(74) Attorney, Agent, or Firm—Burns, Doane, Swecker & Mathis, LLP

(57) ABSTRACT

A cutting insert for chipforming machine has a tip face with a cutting edge. Grooves are formed in the top face and extend toward the cutting edge. Chip-deflecting projections extend upwardly from the top face and are situated in spaces formed between adjacent grooves. A jet of cooling fluid is directed toward inner ends of the grooves and travels between the projections and within the grooves toward the cutting edge.

14 Claims, 2 Drawing Sheets

Figure 2:
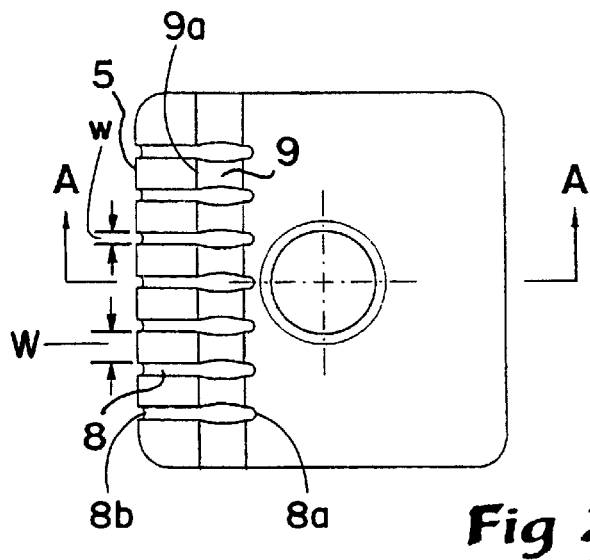

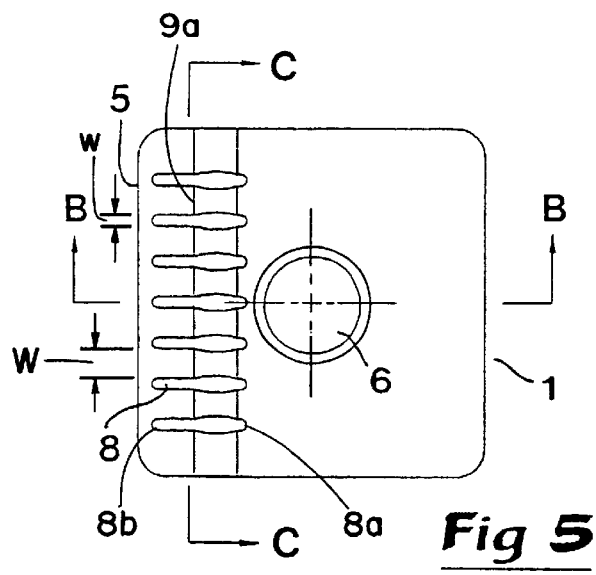
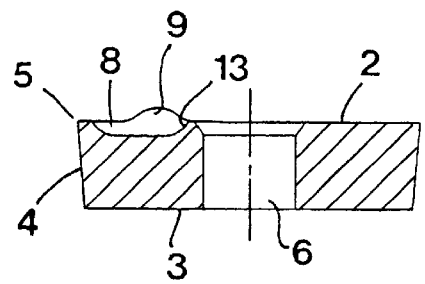
Fig 5
Fig 6
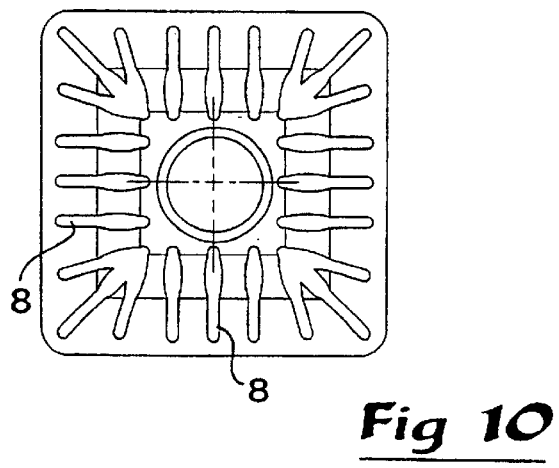
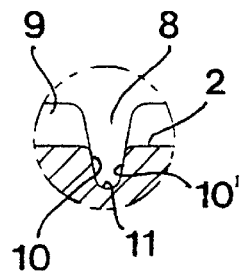
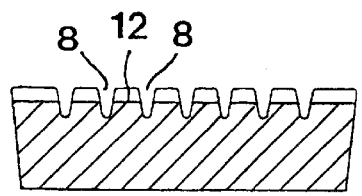
Fig 10
Fig 8
Fig 7
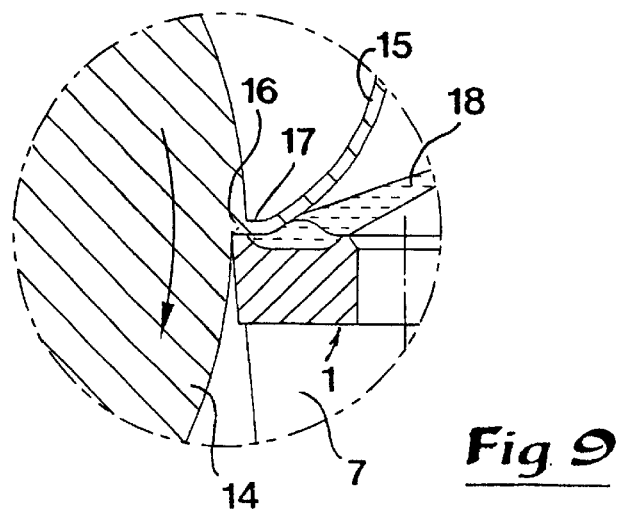
Fig 9

CUTTING INSERT WITH COOLING CHANNEL

TECHNICAL FIELD OF THE INVENTION

This invention relates to a cutting insert intended for chip removing machining, which is delimited by a top side, a bottom side and a number of side surfaces extending therebetween, and which has at least one cutting edge between said top side and a side surface serving as a flank. Grooves which are mutually separated and open upwards, are provided in said top side, in connection with the cutting edge, for feeding cooling liquid in the direction towards the cutting edge.

GENERAL BACKGROUND OF THE INVENTION AND PRIOR ART

The practice of cooling not only the cutting inserts of cutting tools, e.g. tools for turning, but also the workpiece being machined by the tool as well as the chip being cut from the workpiece has been known for a long time. A fundamental aim within the technology of today for cutting machining is to enable the use of the highest possible pressure in the cooling liquid and to supply the liquid in the form of one or more jets mainly directed towards the cutting insert and the chip released thereby. The higher the pressure that can be used in the liquid jet, the greater will be the possibility to use the liquid jet not only for pure cooling, but also to obtain a mechanical effect on the chip, more precisely with the purpose of breaking up the chips into as small particles as possible. There are various opinions among those skilled in the art about what, in this context, is to be considered as low and high liquid pressure, respectively. In general. though, the classification would be likely to be made in the following intervals:

low pressure <10 bar, medium pressure 10–100 bar, and high pressure>100 bar.

In older cutting tools, cooling was carried out using cooling liquid at low-pressure, whereas somewhat more modem cutting tools have worked with cooling liquid at medium-pressure. In the more recent technology, the use of liquid pressures of hundreds of bars is to be found. For instance, U.S. Pat. No. 5,148,728 forecasts the use of liquid pressures as high as 2,800 bar.

When a cutting insert during, for instance, turning cuts loose a chip from a rotating workpiece, usually of metal, considerable amounts of heat are generated. The actual cutting of the chip takes place in a primary shear zone, which is developed in a peripheral portion of the workpiece and extends obliquely upwards, from the cutting edge of the cutting insert. By virtue of the high temperatures developed, not only in the chip and the workpiece, but also in the cutting insert, the chip separated in the primary shear zone cannot slide away across the top side of the cutting insert without being influenced by both friction and resistance. On the contrary, the very hot chip adheres to the top surface of the cutting insert along a certain contact length during a course of events, which has certain similarities to welding. The contact length can, depending on e.g. the material of the workpiece, vary between tenths of a millimetre to a few millimetres backwards from a shear zone which is near the cutting edge. In doing so, the hot material is strongly adhered in a thin layer, above which the proper cutting of the chip takes place by shearing in a secondary shear zone (frequently designated as the weld zone). Hereafter, a so-called friction zone follows, along which the chip is in forceful frictional contact with the cutting insert before leaving this. In order to facilitate the separation of the chip from the cutting insert, mostly some sort of chip deflector is provided; e.g. in the form of bumps or projections on the top side of the actual cutting insert and/or in the form of specific bodies on the tool, in particular clamps for the retention of the cutting insert.

The modern high-pressure cooling-liquid technology aims at introducing the cooling-liquid jet into the substantially wedge-shaped space provided between the bottom side of the chip and the top side of the cutting insert at the point where the chip is initially separated from the cutting insert. The idea is to form a so called hydraulic wedge between the chip and the top side of the cutting insert, and that said wedge should contribute to "break out" the chip and, as far as possible, reduce the extent of the contact length of the chip along the cutting insert. A fundamental aim with the introduction of high-pressure cooling liquid between the chip and the cutting insert is, of course, also to cool these as effectively as possible. However, the attempts to improve the cooling and the flow of the chip away from conventional cutting insert carried out hitherto have not been entirely successful.

OBJECTS AND FEATURES OF THE INVENTION

The present invention aims at obviating the above-mentioned shortcomings of previously known technology and at providing a cutting insert having improved capabilities to more efficiently cool and remove the chips. A primary object of the invention is, therefore, to provide a cutting insert which permits access of high-pressure liquid jets to the area below the zone along which the chip is separated from the cutting insert, at the same time as the chip should be broken out from the top side of the cutting insert as effectively as possible. Another object is to provide a cutting insert that guarantees the intended improvement of the cooling and the removal of chips by means of simple and thereby inexpensive means, more precisely by providing the cutting insert with a new geometric shape.

According to the invention, at least the primary object is attained by the providing a top face of an insert with grooves extending toward the cutting edge, and with upwardly extending chip-deflecting projections 9. At least a portion of each projection is disposed closer to the cutting edge than is an inner end of an adjacent groove. A jet of cooling fluid directed toward the inner ends of the grooves travels between the projections and within the grooves toward the cutting edge.

Further Elucidation of Prior Art

A cutting insert specially constructed for forming threads is previously known through DE 3 740 814, the said insert having a number of grooves for feeding cooling liquid in the direction towards the cutting edge of the cutting insert in the top side thereof. More precisely, three comparatively wide grooves are recessed in the top side of the cutting insert and arranged to co-operate with a separate clamp having the purpose of holding the cutting insert in the appurtenant seat and, at the same time, serving as a chip deflector. The grooves together with the bottom side of the clamp, therefore, define ducts to which cooling liquid is fed from a central main duct in the frame of the cutting tool. This implies, among other things, that the cooling liquid may not be fed in the form of jets with high pressure. Furthermore, this way of feeding the cooling liquid is limited to only the cutting inserts being held by clamps.

BRIEF DESCRIPTION OF THE APPENDED DRAWINGS

Figure 1:
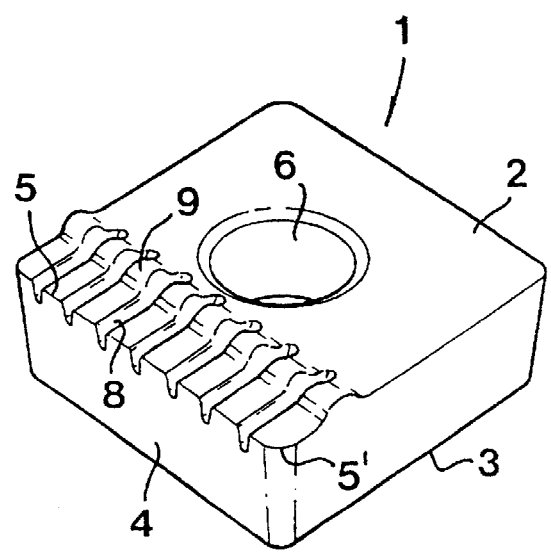

The drawings show:

FIG. 1 a perspective view of a first, simple embodiment of a cutting insert according to the invention, FIG. 2 a planar view from above of the cutting insert according to FIG. 1.

Figure 3:
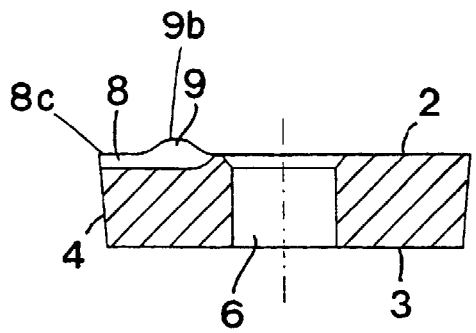
Figure 4:
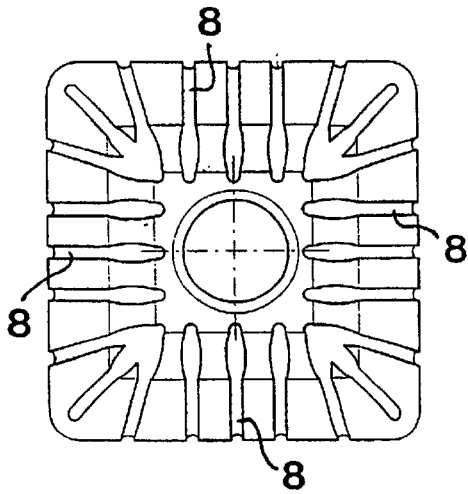

FIG. 3 a section A—A in FIG. 2,

FIG. 4 a planar view corresponding to FIG. 2 of a cutting insert according to a second, alternative embodiment of the cutting insert, FIG. 5 a planar view showing a third embodiment of the cutting insert according to the invention, FIG. 6 a section B—B in FIG. 5, FIG. 7 a section C—C in FIG. 5, FIG. 8 an enlarged, detailed view showing an individual groove in cross-section, FIG. 9 an enlarged, detailed section showing a cutting insert according to FIGS. 5–8 during the turning of a workpiece, and FIG. 10 a planar view showing a fourth, alternative embodiment of the cutting inserts.

DETAILED DESCRIPTION OF THE PREFERRED EMBODIMENTS OF THE INVENTION

In FIGS. 1–3 a cutting insert 1 is shown, which is delimited by a top side 2, a bottom side 3 as well as a number of side surfaces 4 extending therebetween. In the example shown, the number of side surfaces is four. Thus, the insert is of polygonal shape as viewed in top plan. There is a cutting edge 5 between the top side 2 and a side surface 4, which serves as a flank. At the corners of the cutting insert, the straight cutting edge portion 5 transforms into a rounded cutting edge portion 5'. In the generally square-shaped cutting body, there is a central hole 6 for a fixing screw (not shown), by means of which the cutting insert may be fastened in a seat of a cutting tool, e.g. for turning. Parts of this tool are outlined at 7 in FIG. 9.

A number of mutually separated grooves 8, are provided in connection with the cutting edge 5 and said grooves open upwards in the top side of the cutting insert. Projections 9 are arranged between adjacent grooves 8 in a manner which is characteristic for the invention, these projections protrude from the top side of the cutting insert and together form a chip deflector for each chip cut loose by the cutting edge. As may be clearly seen in FIGS. 1 and 3, the individual grooves extend from an area close to the central hole 6, all the way to the flank 4. Thus, in the embodiment example according to FIGS. 1–3, each individual groove opens up into the flank 4.

An outer portion 9a of each projection is disposed closer to the cutting edge 5 than is the inner end 8a of an adjacent groove 8, and is also disposed father from the cutting edge than is an outer end 8b of the groove, as shown in FIGS. 2 and 5. The outer ends 8b of the grooves 8 intersect the top side 2 at a location 8c which is at a lower elevation than an uppermost portion 9b of each projection, as can be seen in FIG. 3.

The embodiment according to FIG. 4 differs from the embodiment according to FIGS. 1–3 only in the fact that sets of grooves 8 are arranged along each one of the four side cutting edges or cutting edges of the cutting insert. In other words, the cutting insert according to FIG. 4 constitutes an indexable insert.

Reference is now made to FIGS. 5–8, which illustrate a third, alternative embodiment of the cutting insert according to the invention. The only fundamental difference between this cutting insert and the cutting insert being visualised in FIGS. 1–3 is that the individual grooves 8 end at a certain distance from the appurtenant cutting edge 5. Accordingly, in this case, the cutting edge 5 extends unbroken between two corners of the cutting insert.

As may be clearly seen in FIGS. 7 and 8, the individual groove 8 has an upwardly diverging cross-sectional shape. More precisely, the groove is delimited by two oblique side walls 10, 10', which at the bottom transform into a mutual bottom surface 11 having a rounded shape. The individual groove should have a depth that is larger than the width thereof on a level with the top surface of the cutting insert 2. In practice, on a level with the top surface, the groove can have a width W in the range of 0.2–0.4 mm, whilst the depth—calculated from the bottom surface 11 to the level of the top surface 2—can be in the range of 0.4–0.6 mm. In FIG. 7, numeral 12 designates a land between two adjacent grooves 8. The width of this land portion should be at least twice as large as the width w of the individual groove 8 on a level with the land portion. In practice, therefore, the width of the land portion amounts to 0.8–1.2 mm or more.

The shape of the individual chip deflector projection 9 should be generally rounded. Thus, as may be seen in FIG. 6, a convexly rounded crown surface transforms into the top surface 2 and a land portion 12, respectively, via concavely rounded transition surfaces. Laterally, the individual projection may advantageously be delimited by extensions of the cutting edge-shaped, diverging side surfaces 10, 10', defining the groove 8.

In FIG. 10, an indexable insert is shown with four sets of grooves instead of only one set of grooves in accordance with FIG. 5.

It should be noted that the projections 9 in all types of embodiments are placed entirely or partly outside the inner ends of the grooves 8, situated closest to the central hole 6. In the drawings, these inner ends of the grooves are designated 13.

Function and Advantages of the Cutting Insert According to the Invention

How a rotating workpiece 14 is submitted to a turning operation by means of the cutting insert I together with the appurtenant tool 7 is schematically shown in FIG. 9. In doing so, the cutting insert cuts a chip designated by 15. The separation of this chip 15 from the workpiece 14 is initiated in a primary shear zone, which is outlined in FIG. 9 by means of the dotted line 16. In a portion of the chip, designated by 17, there is a secondary shear zone, along which the chip finally is separated. The material adheres to the top side of the cutting insert in a thin layer below this shear zone, and a friction zone then follows this before the chip finally leaves the cutting insert.

The number 18 designates a cooling-liquid jet which is ejected at high pressure from a nozzle (not shown) included in the tool and directed against the area between the under side of the chip 15 and the top side of the cutting insert. The pressure in the cooling liquid which leaves the nozzle can to advantage be within the range of 250–1,000 bar, or even more.

Thanks to the presence of the grooves 8 in combination with the chip guiding elements in the form of the projections 9 at least a portion of which is situated between adjacent grooves, the cooling-liquid jet 18 can be led into the space below the chip 15. More precisely, a feeding of the cooling liquid to the immediate vicinity of the cutting edge takes place in the form of a number of partial flows in each of the grooves 8. This implies that the jet operating with high pressure is given improved capability to affect the chip mechanically, inasmuch as this in at least the friction zone is broken up at a steeper angle to the top side of the cutting insert than with previously known technology. This means that the contact length of the chip, from the cutting edge to the point when it separates from the cutting insert, may be reduced. At the same time, the steeper the breaking angle of the chip the easier it is to break it into smaller pieces. Another important advantage of the grooves is that the cooling of the chip as well as of the cutting insert is made more effective. In this way, the chip will be cooled from below in an improved way by the partial flows of the cooling liquid being fed under the chip through the grooves. Concurrently, the portions of the cutting insert adjacent to the grooves will be cooled considerably better than the corresponding surface portions of a conventional cutting insert without grooves for the cooling liquid. In other words, the temperature of the chip as well as of the cutting edge portion of the cutting insert can be radically reduced.

In comparison with the embodiments according to FIGS. 5 and 10, the embodiments according to FIGS. 1 and 4 have the advantage that the cooling liquid supplied can pass out through the ends of the grooves 8, which open, into the flank 4.

What is claimed is:

1. A metal-cutting insert for chip removing machining, comprising a top side, a bottom side, a side surface extending between the top side and the bottom side, and a metal-cutting edge disposed between the top side and the side surface; the top side including a plurality of upwardly open grooves, each groove extending transversely toward the cutting edge from a groove inner end to a groove outer end, the groove outer end terminating at least closely adjacent the cutting edge for conducting cooling fluid toward the cutting edge; projections projecting upwardly from the top surface and defining chip deflectors arranged in alternating relationship with the grooves; at least an outer portion of each projection being disposed closer to the cutting edge than is the inner end of an adjacent groove; the outer ends of the grooves intersecting the top side at a location disposed at a lower elevation than an uppermost portion of each projection; wherein the outer ends of adjacently disposed ones of the grooves are spaced apart by a land defined by the top face, a width of the land being greater than a width of the outer end of each of the grooves.

2. The metal-cutting insert according to claim 1 wherein each groove has side walls which diverge in an upward direction as seen in a cross section of the groove lying in a plane oriented parallel to the cutting edge.

3. The metal-cutting insert according to claim 2 wherein each groove has a depth greater than a width of the outer end of the groove.

4. The metal-cutting insert according to claim 3 wherein the outer end of each groove is spaced inwardly from the cutting edge.

5. The metal-cutting insert according to claim 3 wherein the outer end of each groove intersects the cutting edge.

6. The metal-cutting insert according to claim 1 wherein the outer end of each groove is spaced inwardly from the cutting edge.

7. The metal-cutting insert according to claim 1 wherein the width of the land is greater than two times the width of the outer end of each of the grooves.

8. The metal-cutting insert according to claim 7 wherein the outer portion of each projection is disposed farther from the cutting edge than are the outer ends of adjacent grooves.

9. The metal cutting insert according to claim 1 wherein the insert is of polygonal shape as viewed in top plan.

10. The metal-cutting insert according to claim 9 wherein the outer end of each groove is spaced from the cutting edge.

11. The metal-cutting insert according to claim 9 wherein the outer end of each groove intersects the cutting edge.

12. The metal-cutting insert according to claim 1 wherein the insert includes a cutting edge disposed between the top side and each of a plurality of the side surfaces, each cutting edge provided with the grooves and projections.

13. The metal-cutting insert according to claim 1 wherein the cutting insert includes a cutting corner, a groove extending toward the cutting corner, and projections disposed on opposite sides of that groove.

14. A method of supplying cooling fluid to a metal-cutting edge of a metal-cutting insert during chip removing machining of a metallic workpiece, the cutting insert being of polygonal shape as viewed in top plan and comprising a top side, a bottom side, a number of side surfaces extending between the top side and the bottom side, and a cutting edge disposed between the top side and at least one of the side surfaces; the top side including a plurality of upwardly open grooves, each groove extending transversely toward the cutting edge from a groove inner end to a groove outer end, the groove outer end terminating at least closely adjacent the cutting edge for conducting cooling fluid toward the cutting edge; projections projecting upwardly from the top surface and defining chip deflectors arranged in alternating relationship with the grooves; at least a portion of each projection disposed closer to the cutting edge than is the inner end of an adjacent groove; the method comprising directing a jet of cooling fluid toward the grooves from a location spaced inwardly from the inner ends of the grooves, whereby the cooling fluid travels between the projections and within the respective grooves toward the cutting edge.

* * * * *